(12) United States Patent
Maniktala (10) Patent No.: US 10,581,276 B2
(45) Date of Patent: Mar. 3, 2020

(54) TUNED RESONANT MICROCELL-BASED ARRAY FOR WIRELESS POWER TRANSFER

(71) Applicant: ChargEdge, Inc., Fremont, CA (US)

(72) Inventor: Sanjaya Maniktala, Fremont, CA (US)

(73) Assignee: ChargEdge, Inc., Fremont, CA (US)

(\*) Notice: Subject to any disclaimer, the term of this patent is extended or adjusted under 35 U.S.C. 154(b) by 83 days.

(21) Appl. No.: 15/082,725

(22) Filed: Mar. 28, 2016

(65) Prior Publication Data

US 2016/0285319 A1 Sep. 29, 2016

Related U.S. Application Data (60) Provisional application No. 62/143,682, filed on Apr. 6, 2015, provisional application No. 62/139,785, filed on Mar. 29, 2015.

(51) Int. Cl.

| H02J 50/12 | (2016.01) |
|---|---|
| H02J 50/90 | (2016.01) |
| H02J 7/02 | (2016.01) |
| H02J 50/40 | (2016.01) |

(52) U.S. Cl.
CPC .............. *H02J 50/12* (2016.02); *H02J 50/40* (2016.02)

(58) Field of Classification Search
USPC ........................................................ 307/104
See application file for complete search history.

(56) References Cited

U.S. PATENT DOCUMENTS

| 6,212,430 | B1 | 4/2001 | Kung | |
|---|---|---|---|---|
| 7,456,606 | B1 * | 11/2008 | Legg | ........................ H02J 50/12 320/108 |
| 7,948,781 | B2 | 5/2011 | Esaka et al. | |
| 9,276,437 | B2 | 3/2016 | Partovi et al. | |
| 2005/0073466 | A1 | 4/2005 | Karlsen | |
| 2006/0061324 | A1 | 3/2006 | Oglesbee | |
| 2009/0096413 | A1 | 4/2009 | Partovi et al. | |

(Continued)

FOREIGN PATENT DOCUMENTS

| WO | WO3013122483 A1 | 8/2013 |
|---|---|---|
| WO | 2013/154440 A1 | 10/2013 |

OTHER PUBLICATIONS

Wireless Power Consortium, "Qi System Description Wireless Power Transfer," vol. I: Low Power, Part 1: Interface Definition, Version 1.1.2, Jun. 2013.

(Continued)

*Primary Examiner* — Hal Kaplan
*Assistant Examiner* — Xuan Ly
(74) *Attorney, Agent, or Firm* — White & Case LLP (57) ABSTRACT

In one embodiment, an array for wireless power transfer includes a plurality of tuned resonant microcell structures (hereinafter "microcell"). Each microcell comprises at least one coil, at least one capacitor, and two connection points. Each microcell in the array is configured to be individually tuned to the same resonant frequency. The microcells in the array are connected together in a series through the two connection points of each microcell in such a way that the array is configured to have the same resonant frequency as each of the individually tuned microcells. The multiple coil structure may be connected to a power source and can be implemented in a wireless power transmitter.

14 Claims, 10 Drawing Sheets

(56) References Cited

U.S. PATENT DOCUMENTS

| | | |
|---|---|---|
| 2010/0181841 A1 | 7/2010 | Azancot et al. |
| 2010/0259217 A1 | 10/2010 | Baarman et al. |
| 2011/0084652 A1 | 4/2011 | Julstrom et al. |
| 2011/0115429 A1 | 5/2011 | Toivola et al. |
| 2011/0217927 A1 | 9/2011 | Ben-Shalom et al. |
| 2011/0304216 A1 | 12/2011 | Baarman |
| 2012/0154086 A1 | 6/2012 | Willemsen et al. |
| 2013/0043734 A1 | 2/2013 | Stone et al. |
| 2013/0093252 A1* | 4/2013 | Norconk ............... H02J 5/005 307/104 |
| 2013/0175877 A1 | 7/2013 | Abe et al. |
| 2013/0194149 A1* | 8/2013 | Kimura ............... H01Q 1/2225 343/803 |
| 2013/0214591 A1 | 8/2013 | Miller et al. |
| 2013/0249479 A1 | 9/2013 | Partovi |
| 2013/0307468 A1 | 11/2013 | Lee et al. |
| 2014/0070622 A1 | 3/2014 | Keeling et al. |
| 2014/0167688 A1 | 6/2014 | Doyle et al. |
| 2014/0232330 A1 | 8/2014 | Robertson et al. |
| 2014/0266031 A1 | 9/2014 | Sasaki |
| 2015/0069847 A1 | 3/2015 | Meyer et al. |
| 2015/0091388 A1 | 4/2015 | Golko et al. |
| 2015/0295416 A1 | 10/2015 | Li |
| 2015/0372493 A1 | 12/2015 | Sankar |
| 2016/0111887 A1 | 4/2016 | Jeong |
| 2016/0164332 A1* | 6/2016 | Elkhouly ............... H02J 50/12 320/108 |
| 2016/0181987 A1* | 6/2016 | Perreault ............... H03F 3/2176 330/251 |
| 2017/0158064 A1* | 6/2017 | Yasuda ............... B60L 11/182 |

OTHER PUBLICATIONS

Maniktala, S., "Fixing EMI across the Board," EE Times, Nov. 5, 2003, http://www.eetimes.com/document.asp? doc_id=1230444.

Maniktala, S., "More on Designing Reliable Electronic Ballasts," EE Times, Apr. 20, 2005, http://www.eetimes.com/document.asp?doc_id=1272231.

Maniktala, S., "The Confluence of Resonant Switching Topologies and Wireless Charging," presented at ISSCC 2015, San Francisco, CA, Feb. 26, 2015.

Maniktala, S., "WPT Breaks All Connections, Part 1," EDN Network, Mar. 9, 2015, http://www.edn.com/design/power-management/4438850/WPT-breaks-all-connections-Part-1.

Maniktala, S., "WPT Breaks All Connections, Part 2," EDN Network, Mar. 14, 2015, http://www.edn.com/design/power-management/4438924/WPT-breaks-all-connections-Part-2.

Maniktala, S., "WPT Breaks All Connections, Part 3," EDN Network, Apr. 6, 2015, http://www.edn.com/design/power-management/4439125/WPT-breaks-all-connections-Part-3.

Power Matters Alliance, "PMA Inductive Wireless Power and Charging Transmitter Specification—System Release 1," PMA-TS-0003-0 v2.00, Apr. 24, 2014.

Power Matters Alliance, "PMA Inductive Wireless Power and Charging Receiver Specification—System Release 1," PMA-TS-0001-0 v1.00, Nov. 16, 2013.

"Notification of Transmittal of the International Search Report and The Written Opinion of the International Searching Authority," Int'l Appl. No. PCT/US2016/024483, dated Jun. 20, 2016.

"Notification of Transmittal of the International Search Report and The Written Opinion of the International Searching Authority," Int'l Appl. No. PCT/US2016/66105, dated Feb. 17, 2017.

"Notification of Transmittal of the International Search Report and The Written Opinion of the International Searching Authority," Int'l Appl. No. PCT/US2017/020465, dated May 11, 2017.

"Notification of Transmittal of the International Search Report and The Written Opinion of the International Searching Authority," Int'l Appl. No. PCT/US2017/49756, dated Nov. 9, 2017.

"Notification of Transmittal of the International Search Report and The Written Opinion of the International Searching Authority," Int'l Appl. No. PCT/US2017/0358989, dated Aug. 28, 2017.

\* cited by examiner

TUNED RESONANT MICROCELL-BASED ARRAY FOR WIRELESS POWER TRANSFER

CROSS-REFERENCE TO RELATED APPLICATIONS

This application claims the benefit of and incorporates by reference in its entirety U.S. Provisional Patent Application No. 62/143,682, entitled "Tuned Resonant Microcell-Based Arrays in Wireless Power Systems," filed on Apr. 6, 2015 and U.S. Provisional Patent Application No. 62/139,785, entitled "Wireless Power Transfer Method Using Multiple Coil Arrays," filed on Mar. 29, 2015.

FIELD OF THE INVENTION

This invention is generally related to wireless power transfer and more specifically to a wireless power transmitter having an array with a plurality of tuned resonant microcells.

BACKGROUND OF THE INVENTION

Electronic devices typically require a connected (wired) power source to operate, for example, battery power or a wired connection to a direct current ("DC") or alternating current ("AC") power source. Similarly, rechargeable battery-powered electronic devices are typically charged using a wired power-supply that connects the electronic device to a DC or AC power source. The limitation of these devices is the need to directly connect the device to a power source using wires.

Wireless power transfer (WPT) systems typically use time-varying magnetic fields and the principle of magnetic induction or magnetic resonant induction to transfer power wirelessly. In accordance with Faraday's Law, a time-varying current applied to a transmitter coil produces a magnetic field that will induce a voltage in a receiver coil that is in close proximity to the transmitter coil. The induced voltage in the receiver coil is typically rectified and filtered to produce a substantially direct current (DC) voltage that can provide power to an electronic device or a rechargeable battery. Such wireless power transfer systems may use magnetic induction or magnetic resonant induction techniques, both of which emit magnetic flux in the "near-field." Such near-field techniques are capable of transferring power only when the transmitter coil and the receiver coil are within a short distance from one another, typically on the order of a few centimeters or less.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Figure 1:
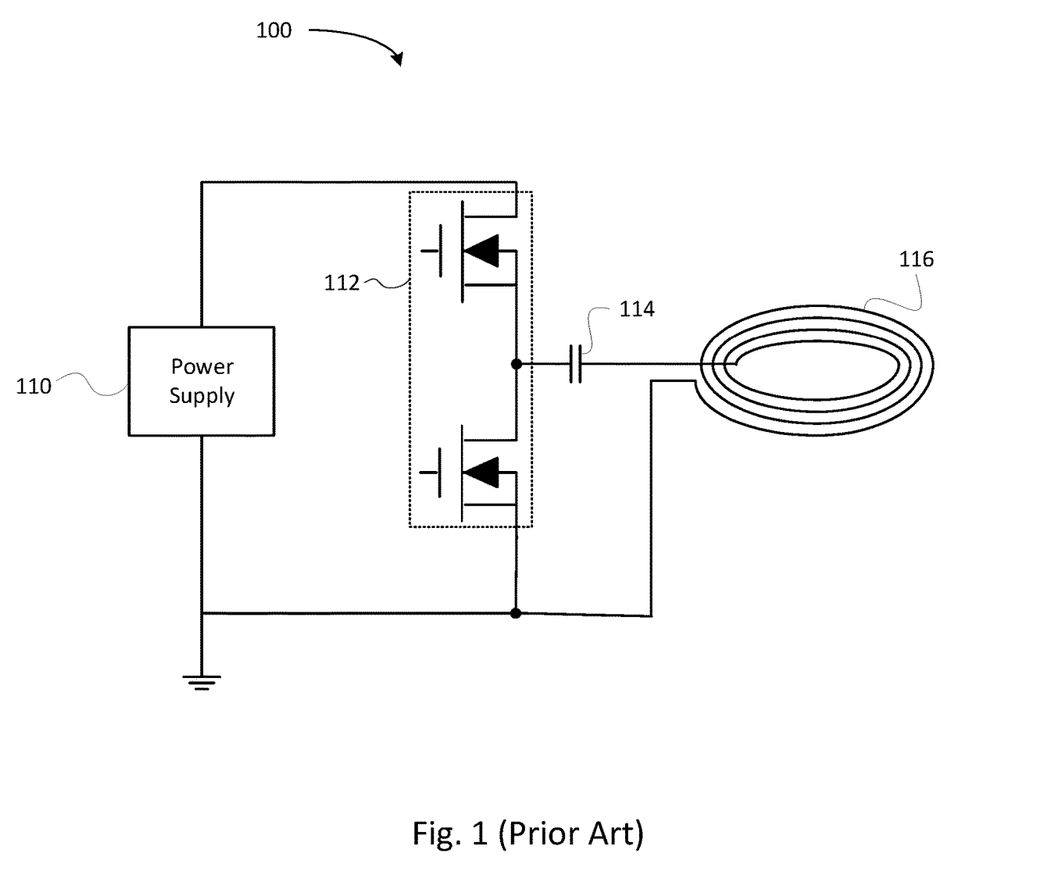
FIG. 1 is a diagram of a prior art embodiment of wireless power transmitter with a single coil.

FIG. 1 is a diagram of a prior art embodiment of a single coil structure for wireless power transfer. A transmitter 100 includes a power supply 110, a half-bridge 112, a capacitor 114, and a coil 116. Coil 116 is typically a flat spiral coil with a predetermined number of turns. Half-bridge 112 is controlled by a control circuit (not shown) to provide an alternating current to capacitor 114 and coil 116. The current is typically in the range of 100 KHz to 400 kHz. The capacitance value of capacitor 114 and the inductance value of coil 116 determine a resonant frequency for transmitter 100. The alternating current passing through coil 116 generates magnetic flux that can induce a current in a receiver coil (not shown).

One drawback of single coil wireless power transmitters is that the size of the single coil limits the size of the transmitting surface of the power transmitter. In single coil wireless power transmitters, the area of the single transmitter coil is limited by the magnetic field necessary to induce a sufficiently large current in a receiver coil. This limitation results from the fact that the magnetic flux produced by a coil is inversely proportional to its area. A small coil in the power transmitter makes its alignment with the receiver coil in the device to be charged more critical.

Current attempts to create larger wireless transmitter surfaces are problematic for a variety of reasons. One attempt involves simply enlarging the coil. But merely enlarging the area of a spiral coil causes the magnetic flux generated by the coil to be weaker, particularly in the middle of the coil. Another attempt is to use multiple coils, connected in series or in parallel, which would theoretically allow more than one coil to be engaged simultaneously in the wireless power transfer process. However, a wireless transmitter that includes multiple coils comes with its own set of drawbacks.

For example, multiple coils may also be connected together in parallel but if all coils are activated simultaneously, small differences in the coils' characteristics could cause unforeseen circulating currents and electromagnetic interference loops. Multiple coils may also be connected together in series. Series-connected coils may be switched in and out of the power transfer process as desired depending on the needs of the receiving device(s). However, the problem with creating configurable series-connected coils in this manner is that switching coils in and out of the wireless power transfer process changes the net series inductance of the circuit, which ultimately changes the resonant frequency of the transmitter. Changes in the resonant frequency could interfere with wireless power transfer and, in particular, adhering to a wireless power transfer standards (e.g., the Qi standard requires a resonant frequency of 100 kHz).

There is, therefore, an unmet demand for efficient wireless transmitters having transmitting surfaces of a customizable size, while maintaining the resonant frequency of the transmitter as the size of the transmitting surface changes.

SUMMARY

In one embodiment, an array for wireless power transfer includes a plurality of tuned resonant microcell structures (hereinafter "microcell") and is connected to at least one power source. Each microcell comprises at least one coil, at least one capacitor, and two connection points. Each microcell in the array is configured to be individually tuned to the same resonant frequency. The microcells in the array are connected together in a series through the two connection points of each microcell in such a way that the array is configured to have the same resonant frequency as each of the individually tuned microcells. The array can be implemented in a wireless power transmitter.

In one embodiment, an array for wireless power transfer includes a plurality of microcells, is connected to at least one power source, and at least one switch. Each microcell comprises at least one coil, at least one capacitor, and two connection points. Each microcell in the array is configured to be individually tuned to the same resonant frequency. The microcells in the array are connected together in series through the two connection points of each microcell in such a way that the array is configured to have the same resonant frequency as each of the individually tuned microcells. Toggling of at least one switch enables activation of either a subset or all of the microcells of the array. The array can be implemented in a wireless power transmitter.

DETAILED DESCRIPTION OF THE INVENTION

Figure 2A:
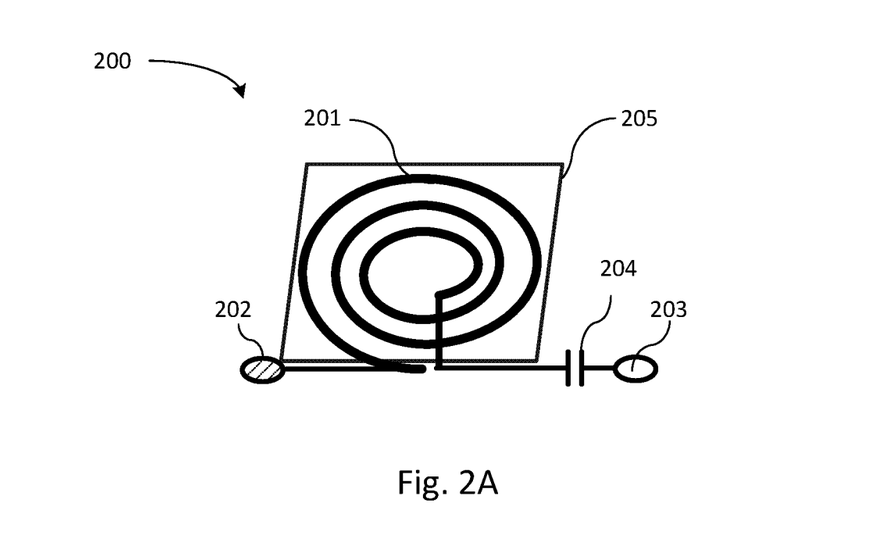
FIG. 2A is a diagram of a tuned resonant microcell, according to one embodiment of the invention.
Figure 2B:
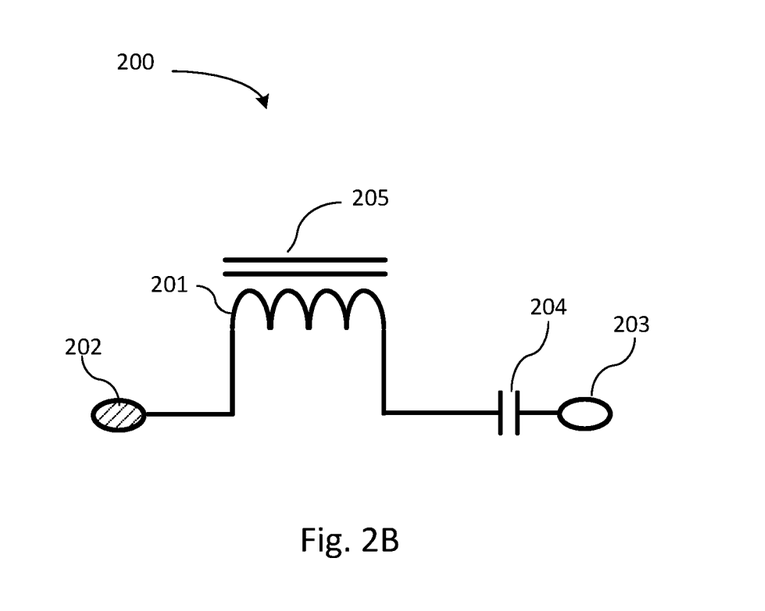
FIG. 2B is a schematic diagram of the tuned resonant microcell as shown in FIG. 2A.

FIG. 2A is a diagram illustrating one embodiment of an individual tuned resonant microcell (hereinafter, "microcell") 200. Microcell 200 includes a coil 201, connection terminals 202 and 203, a capacitor 204, and a magnetic material layer 205. Coil 201 is typically a flat spiral coil having a predetermined number of turns, and wound in either the clockwise or counter-clockwise direction. A current may be injected into connection point 202, which would cause a current to flow around coil 201. The capacitance of capacitor 204 and the inductance of coil 201 determine the resonant frequency of microcell 200. Magnetic material layer 205 is a substantially flat layer and may be made of ferrite. Alternatively, magnetic material layer 205 may have raised edges around coil 201 or raised edges in the middle of coil 201. FIG. 2B illustrates a schematic view of microcell 200 having the same elements described with respect to FIG. 2A.

Figure 3A:
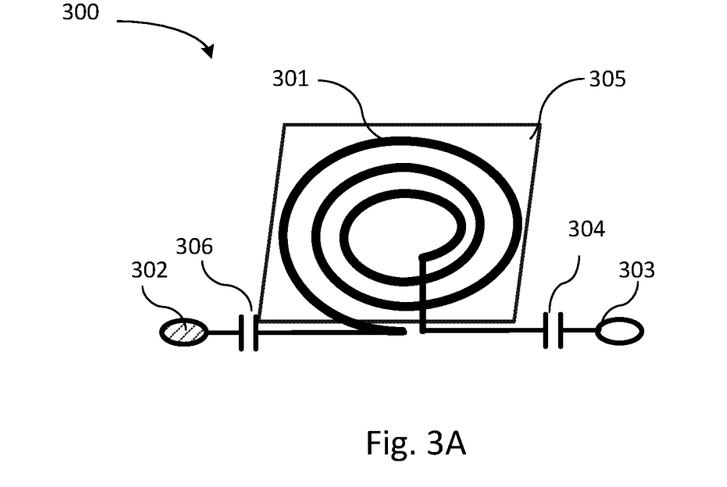
FIG. 3A is a diagram of a tuned resonant microcell, according to one embodiment of the invention.
Figure 3B:
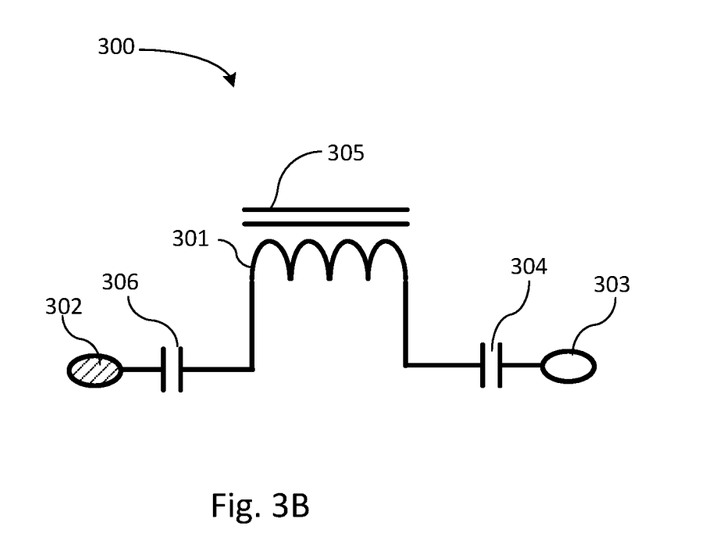
FIG. 3B is a schematic diagram of the tuned resonant microcell as shown in FIG. 3A.

FIG. 3A is a diagram illustrating another embodiment of a microcell 300. Microcell 300 comprises a coil 301, connection terminals 302 and 303, capacitors 304 and 306, and a magnetic material layer 305. Capacitors 304 and 306 have the same net desired effective series capacitance value as the capacitor 204 in FIG. 2A. FIG. 3B illustrates a schematic view of microcell 300.

Figure 4:
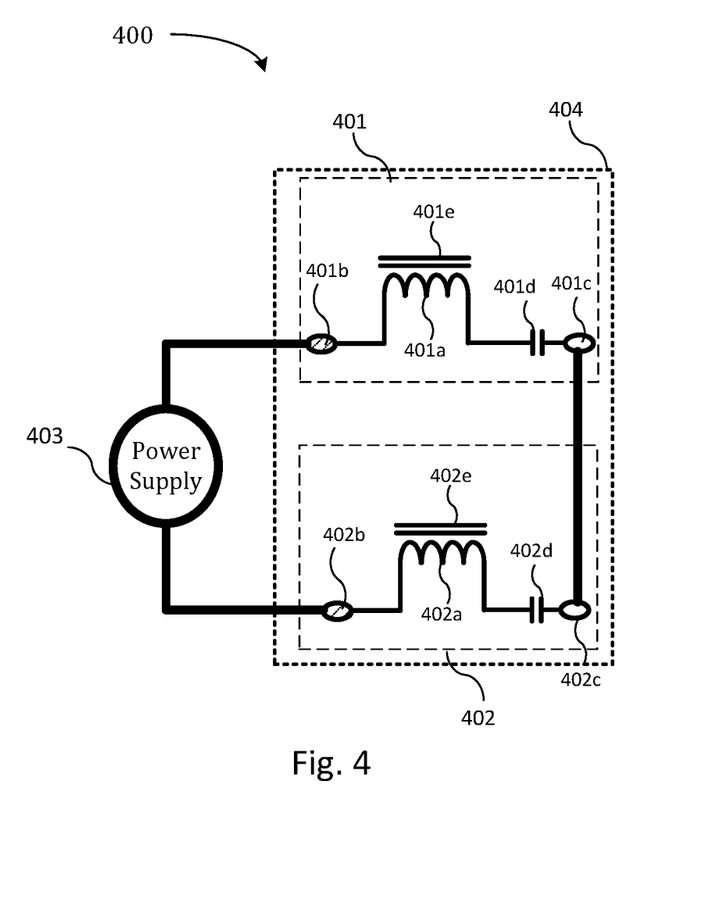
FIG. 4 is a schematic diagram of a wireless power transmitter with an array including multiple tuned resonant microcells, according to one embodiment of the invention.

FIG. 4 is a schematic diagram illustrating one embodiment of wireless power transmitter 400 including, but not limited to, an array 404 including a first microcell 401 and a second microcell 402, and a power source 403. Microcells 401 and 402 are connected in series. While only two microcells are shown, one of ordinary skill in the art would understand that array 404 may include additional microcells that are connected in series with microcells 401 and 402, as long as the additional microcells are tuned to the same resonant frequency as microcells 401 and 402. Microcell 401 includes a coil 401a, a first connection point 401b, a second connection point 401c, a capacitor 401d, and a magnetic material layer 401e. Similarly, microcell 402 includes a coil 402a, a first connection point 402b, a second connection point 402c, a capacitor 402d, and a magnetic material layer 402e. Microcells 401 and 402 have separate magnetic material layers 401e and 402e, respectively so that microcells 401 and 402 are not magnetically linked to each other.

Microcell 401 and microcell 402 are tuned to the same resonant frequency, which causes array 404 to operate at the same resonant frequency as each of microcells 401 and 402. This property remains true no matter how many microcells are added to the array, as long as each microcell is tuned to the same resonant frequency, and is illustrated by the following calculations.

Assuming, $L_1$ and $C_1$ represent the inductance and capacitance of microcell 401, respectively and $L_2$ and $C_2$ represent the inductance and capacitance of microcell 402, respectively, then $F_{R(1)}$, which represents the resonant frequency of microcell 401, and $F_{R(2)}$, which represents the resonant frequency of microcell 402, may be represented by the following equations:

$$F_{R(1)} = \frac{1}{2\pi\sqrt{L_1 C_1}},$$

$$F_{R(2)} = \frac{1}{2\pi\sqrt{L_2 C_2}}$$

If the resonant frequency $F_{R(1)}$ of microcell 401 is equal to the resonant frequency $F_{R(2)}$ of microcell 402, then:

$$\frac{1}{2\pi\sqrt{L_1 C_1}} = \frac{1}{2\pi\sqrt{L_2 C_2}}$$

$$L_1 C_1 = L_2 C_2$$

The inductance L and capacitance C of array 404 including microcells 401 and 402 connected in series may be illustrated by the following:

$$L = L_1 + L_2,$$

$$C = \frac{C_1 C_2}{C_1 + C_2}$$

The resonant frequency $F_R$ of the array may then be represented by the following equation:

$$F_R = \frac{1}{2\pi\sqrt{LC}} = \frac{1}{2\pi\sqrt{(L_1 + L_2)\left(\frac{C_1 C_2}{C_1 + C_2}\right)}} = \frac{1}{2\pi\sqrt{\left(\frac{L_1 C_1 C_2 + L_2 C_1 C_2}{C_1 + C_2}\right)}}$$

Because $L_1 C_1 = L_2 C_2$, the resonant frequency $F_R$ of array 404 may be shown to equal the resonant frequency $F_{R(1)}$ of microcell 401 and the resonant frequency $F_{R(2)}$ of microcell 402:

$$F_R = \frac{1}{2\pi\sqrt{\left(\frac{L_1 C_1 (C_2 + C_1)}{C_1 + C_2}\right)}} = \frac{1}{2\pi\sqrt{L_1 C_1}} = F_{R(1)} = F_{R(2)}$$

This relationship between the resonant frequency $F_R$ of array 404 and the resonant frequencies of its microcells illustrates that the resonant frequency of array 404 may be maintained no matter how many microcells are activated in series as part of array 404, as long as the resonant frequency of each microcell within the series is tuned to the same resonant frequency. In this manner, the size of the transmission area of array 404 may be adjusted (i.e., by increasing the number of the microcells that are involved in the wireless power transfer process) while maintaining a constant resonant frequency for array 404. Microcells 401 and 402 may be dynamically deactivated or activated within the series without affecting the resonant frequency of array 404.

Microcell 401 may have a different inductance and capacitance than microcell 402 as long as the resonant frequencies for each microcell are equivalent. Similarly, coil 401a and coil 402a may have substantially the same or different shape, number of turns, and total area, as long as the resonant frequency of the microcells is the same. Although not shown in FIG. 4, coils 401a and 402a are flat coils of generally square shape; however, coils of any flat shape such as circular or rectangular are within the scope of the invention. Because microcells 401 and 402 are connected in series, a current passing through microcell 401 has the same value as a current passing through microcell 402.

Power source 403 provides an AC signal to array 404, and may include a DC voltage source and a half-bridge, although any circuit configured to generate an AC signal is within the scope of the invention. Power source 403 generates an AC signal of a defined voltage magnitude. The generated AC signal can be, but is not limited to, a square wave, a sinusoidal wave, a triangular wave, or a sawtooth wave. The AC signal causes current to flow from power source 403 to coil 401a through a connection point 401b. The flow of current through coil 401a generates a magnetic field. The current flows from coil 401a to coil 402a through a second connection point 401c of microcell 401 to a first connection point 402c of microcell 402.

Figure 5:
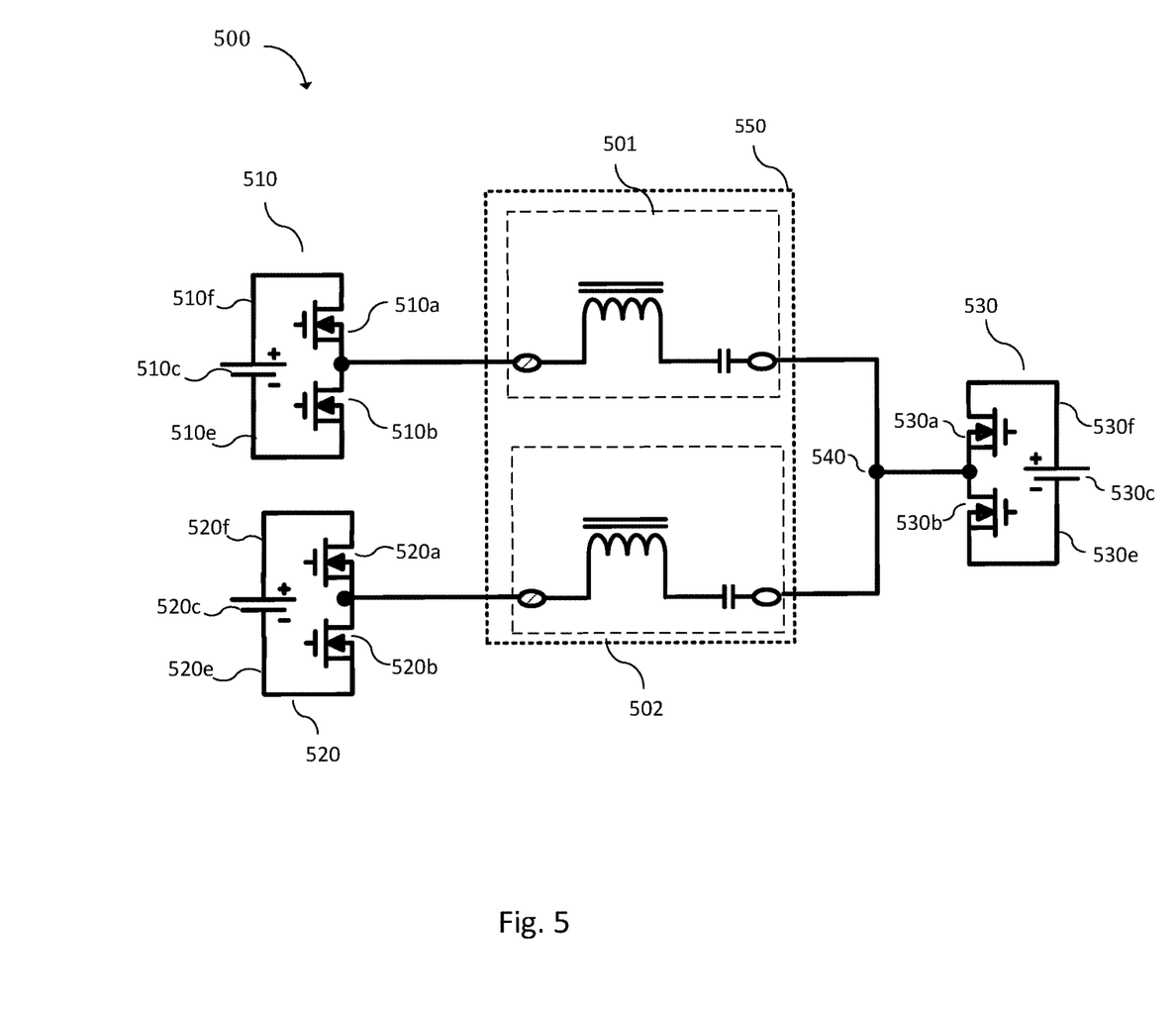
FIG. 5 is a schematic diagram of a wireless power transmitter with an array including multiple tuned resonant microcells, according to one embodiment of the invention.

FIG. 5 illustrates another embodiment of the invention. Wireless power transmitter 500 includes, but is not limited to, an array 550 including microcells 501 and 502, and general field-effect transistor (FET) half-bridges 510, 520, and 530, and a shared node 540 situated between microcells 501 and 502. Microcells 501 and 502 are tuned to the same resonant frequency and are connected in series. Half-bridge 510 includes FETs 510a and 510b, a DC voltage source 510c, an upper rail 510f, and lower rail 510e. Although DC voltage source 510c and half-bridge 510 are shown in FIG. 5, any circuit configured to generate an AC signal is within the scope of the invention. The generated voltage signal can be, but is not limited to, a square wave, a sinusoidal wave, a triangular wave, or a sawtooth wave. Lower rail 510e may be designated as ground for transmitter 500. FETs 510a may receive power from DC voltage source 510c through upper rail 510f. Similarly, half-bridge 520 includes FETs 520a and 520b, a DC voltage source 520c, an upper rail 520f, and lower rail 520e. DC voltage sources 510c, 520c and 530 c have at least one shared supply rail for ensuring proper operation. For example, all the three voltage sources may have their upper (positive) terminals connected to each other, or all may have their lower (negative) rails connected together, Although DC voltage source 520c and half-bridge 520 are shown in FIG. 5, any circuit configured to generate an AC signal is within the scope of the invention. Half-bridges 510 and 520 are controlled by a gate-control circuit (not shown) to provide an AC signal to array 550. While only two microcells are shown, one of ordinary skill in the art would understand that array 550 may include additional microcells that are connected in series with microcells 501 and 502, as long as the additional microcells are tuned to the same resonant frequency as microcells 501 and 502.

Microcells 501 and 502 share the same components of microcell 200 as described above with respect to FIG. 2A and the discussion of its components is not repeated here. Microcell 501 may have a different inductance and capacitance than microcell 502 as long as the resonant frequencies for each microcell are equivalent. Because microcells 501 and 502 are connected in series, a current passing through microcell 501 has the same value as a current passing through microcell 502. Additional microcells, tuned to the same resonant frequency as microcells 501 and 502, may be added to array 550, without affecting the resonant frequency of array 550. In this manner, the size of the transmission area of array 550 may be adjusted (i.e., by increasing the number of the microcells that are involved in the wireless power transfer process) while maintaining a constant resonant frequency for array 550.

Half-bridge 530 includes FETs 530a and 530b, upper rail 530f, and lower rail 530e. Half-bridge 530 is shown with an optional power source 530c, which may be omitted from transmitter 500. Half-bridge 530 does not necessarily switch at the frequency of half-bridges 510 and 520, but instead may be used to force shared node 540 to a high or low voltage level, for at least one full switching cycle of half-bridges 510 and 520. In this embodiment, FETs 530a and 530b are held off, which causes the current flowing from half-bridge 510 to be equal to the current flowing into half-bridge 520, and vice versa. When the currents of half-bridges 510 and 520 are equal, microcells 501 and 502 of array 550 may be considered to be connected in series, and therefore array 550 has the same resonant frequency as microcells 501 and 502.

While two half-bridges 510 and 520 are shown coupled to array 550, only one half-bridge needs to be toggled at a certain resonant frequency to be within the scope of the invention. For example, half-bridge 510 may be toggled at a frequency of 100 kHz and half-bridge 520 may be held to ground or to the upper rail. Current may flow in either direction through array 550. If FET 510a of half-bridge 510 and FET 520b of half-bridge 520 are held on and FET 510b of half-bridge 510 and FET 520a of half-bridge 520 are held off, current flows from half-bridge 510 through microcell 501 to microcell 502. To complete the switching cycle, if FET 510a of half-bridge 510 and FET 520b of half-bridge 520 are held off and FET 510b of half-bridge 510 and FET 520a of half-bridge 520 are held on, the current will reverse direction through array 550. In one embodiment, all three half-bridges may be toggled at the same frequency but with varying phase angles between the three half-bridges, to individually regulate and control power to separate receivers (not shown) placed on the two transmitting coils. In a more general case, there may be more than three such half-bridges, connected via intervening microcell structures.

Figure 6:
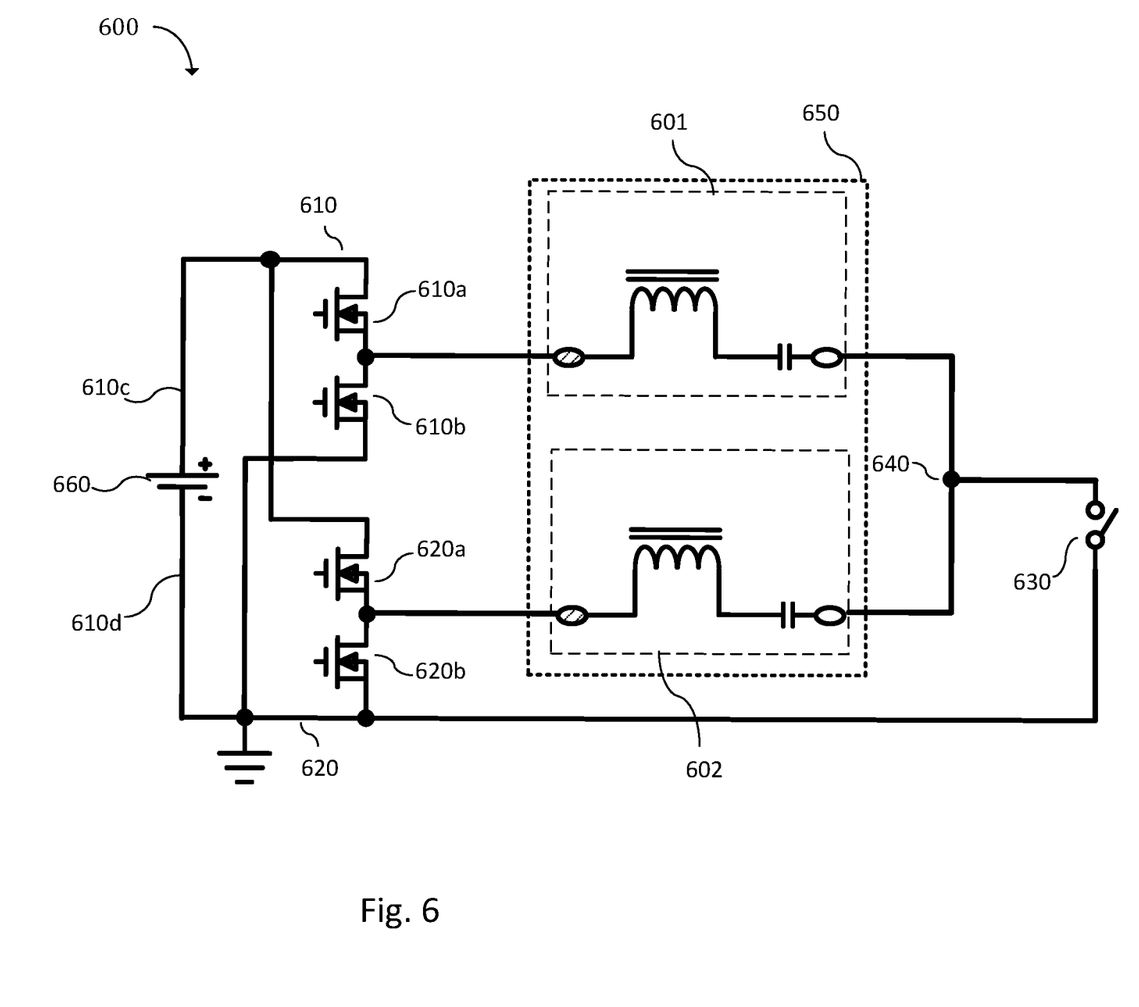
FIG. 6 is a schematic diagram of a wireless power transmitter with an array including multiple tuned resonant microcells, according to one embodiment of the invention.

FIG. 6 illustrates another embodiment of the invention. Wireless power transmitter 600 includes, but is not limited to, an array 650 including microcells 601 and 602, half-bridges 610 and 620, a switch 630, a shared node 640, an upper rail 610c, a lower rail 610d, and a single DC voltage source 660. Half-bridge 610 includes FETs 610a and 610b and half-bridge 620 includes FETs 620a and 620b. Although DC voltage source 660 and half-bridges 610 and 620 are shown in FIG. 6, any circuit configured to generate an AC signal is within the scope of the invention. The generated voltage signal can be, but is not limited to, a square wave, a sinusoidal wave, a triangular wave, or a sawtooth wave. Switch 630, which may be implemented as a mechanical, electrical, or electronic switch, serves the same purpose as half-bridge 530 as described above with respect to FIG. 5. When switch 630 is open (OFF), microcells 601 and 602 are connected in series (i.e., the current in microcell 601 is equivalent to the current in microcell 602) and therefore array 650 has the same resonant frequency as microcells 601 and 602. While only two microcells are shown, one of ordinary skill in the art would understand that array 650 may include additional microcells that are connected in series with microcells 601 and 602, as long as the additional microcells are tuned to the same resonant frequency as microcells 601 and 602.

Current may flow in either direction through array 650. If FET 610a of half-bridge 610 and FET 620b of half-bridge 620 are held on and FET 610b of half-bridge 610 and FET 620a of half-bridge 620 are held off, current flows from half-bridge 610 through microcell 601 to microcell 602. To complete the switching cycle, if FET 610a of half-bridge 610 and FET 620b of half-bridge 620 are held off and FET 610b of half-bridge 610 and FET 620a of half-bridge 620 are held on, the current will reverse direction through array 650.

Microcells 601 and 602 share the same components of microcell 200 as described above with respect to FIG. 2A and the discussion of its components is not repeated here. Microcell 601 may have a different inductance and capacitance than microcell 602 as long as the resonant frequencies for each microcell are equivalent. Because microcells 601 and 602 are connected in series, a current passing through microcell 601 has the same value as a current passing through microcell 602. When switch 630 is open (OFF), the current flowing from half-bridge 610 is equal to the current flowing into half-bridge 620, and vice versa. When the current of half-bridges 610 and 620 are equal, microcells 601 and 602 of array 650 may be considered to be connected in series, and therefore the array 650 has the same resonant frequency as microcells 601 and 602. Additional microcells, tuned to the same resonant frequency as microcells 601 and 602, may be added to array 650 with affecting the resonant frequency of array 650. In this manner, the size of the transmission area of array 650 may be adjusted (i.e., by increasing the number of the microcells that are involved in the wireless power transfer process) while maintaining a constant resonant frequency for array 650.

Figure 7:
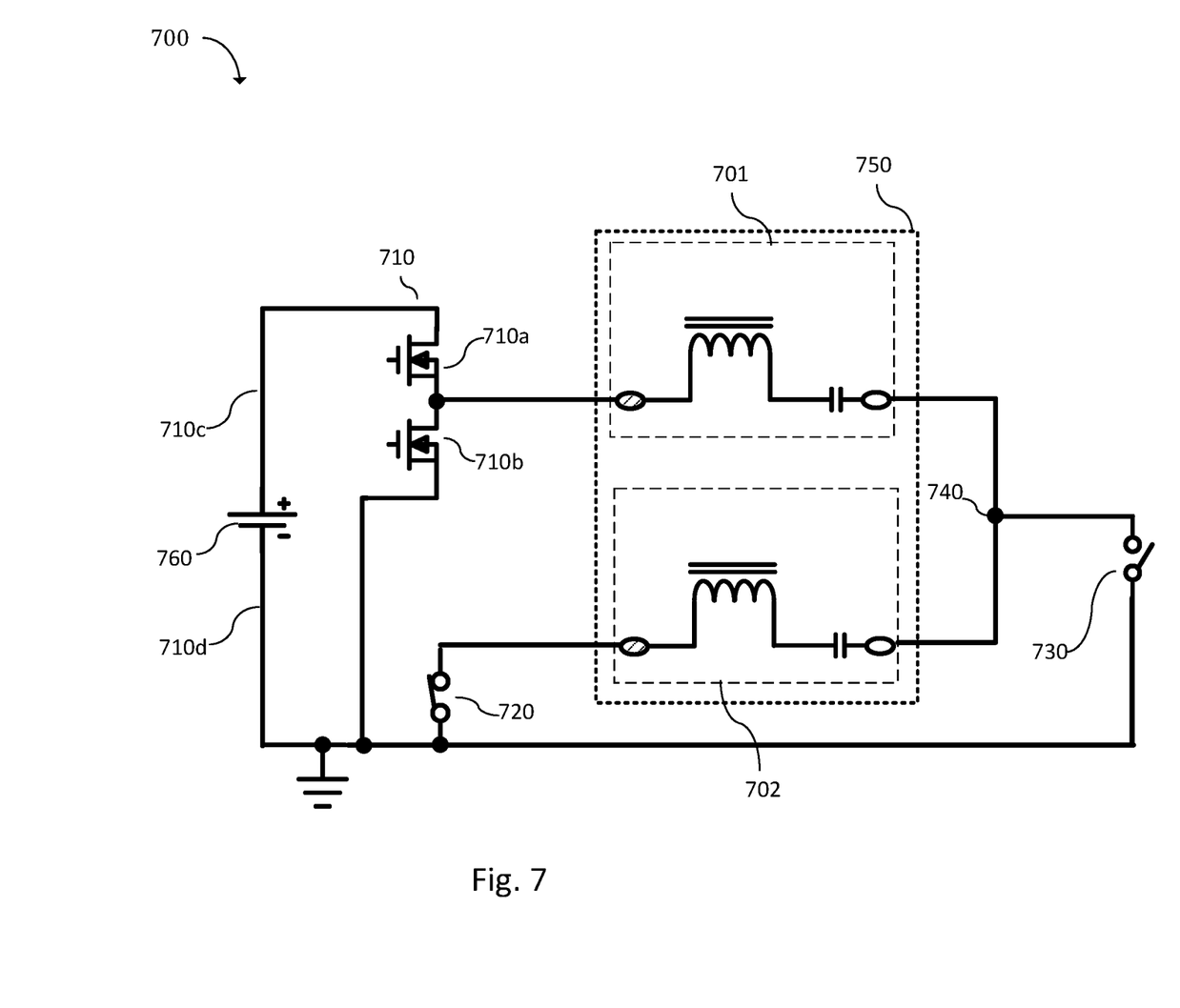
FIG. 7 is a schematic diagram of a wireless power transmitter with an array including multiple tuned resonant microcells, according to one embodiment of the invention.

FIG. 7 illustrates another embodiment of the invention. Wireless power transmitter 700 includes, but is not limited to, an array 750 including microcells 701 and 702, half-bridge 710, switches 720 and 730, shared node 740, upper rail 710c, lower rail 710d, and a DC voltage source 760. Half-bridge 710 comprises FETs 710a and 710b. Although DC voltage source 760 and half-bridge 710 are shown in FIG. 7, any circuit configured to generate an AC signal is within the scope of the invention. The generated voltage signal can be, but is not limited to, a square wave, a sinusoidal wave, a triangular wave, or a sawtooth wave. Switch 720, which may be implemented as a mechanical, electrical, or electronic switch, serves the same purpose as half-bridge 520 as described above with respect to FIG. 5. Switch 730, which may be implemented as a mechanical, electrical, or electronic switch, serves the same purpose as half-bridge 530 as described above with respect to FIG. 5. When switch 720 is closed and switch 730 is open, microcells 701 and 702 are connected in series (i.e., the current in microcell 701 is equivalent to microcell 702) and therefore array 750 has the same resonant frequency as microcells 701 and 702.

While only two microcells are shown, one of ordinary skill in the art would understand that array 750 may include additional microcells that are connected in series with microcells 701 and 702, as long as the additional microcells are tuned to the same resonant frequency as microcells 701 and 702. Microcells 701 and 702 share the same components of microcell 200 as described above with respect to FIG. 2A and the discussion of its components is not repeated here. Microcell 701 may have a different inductance and capacitance than microcell 702 as long as the resonant frequencies for each microcell are equivalent. Because microcells 701 and 702 are connected in series, a current passing through microcell 701 has the same value as a current passing through microcell 702. Additional microcells, tuned to the same resonant frequency as microcells 701 and 702, may be added to array 750 without affecting the resonant frequency of array 750. In this manner, the size of the transmission area of array 750 may be adjusted (i.e., by increasing the number of the microcells that are involved in the wireless power transfer process) while maintaining a constant resonant frequency for array 750.

When switch 730 is open (OFF), the current flowing from half-bridge 710 is equal to the current flowing into switch 720, and vice versa. When the current of half-bridge 710 and switch 730 are equal, microcells 701 and 702 of array 750 may be considered to be connected in series, and therefore array 750 has the same resonant frequency as microcells 701 and 702.

Figure 8:
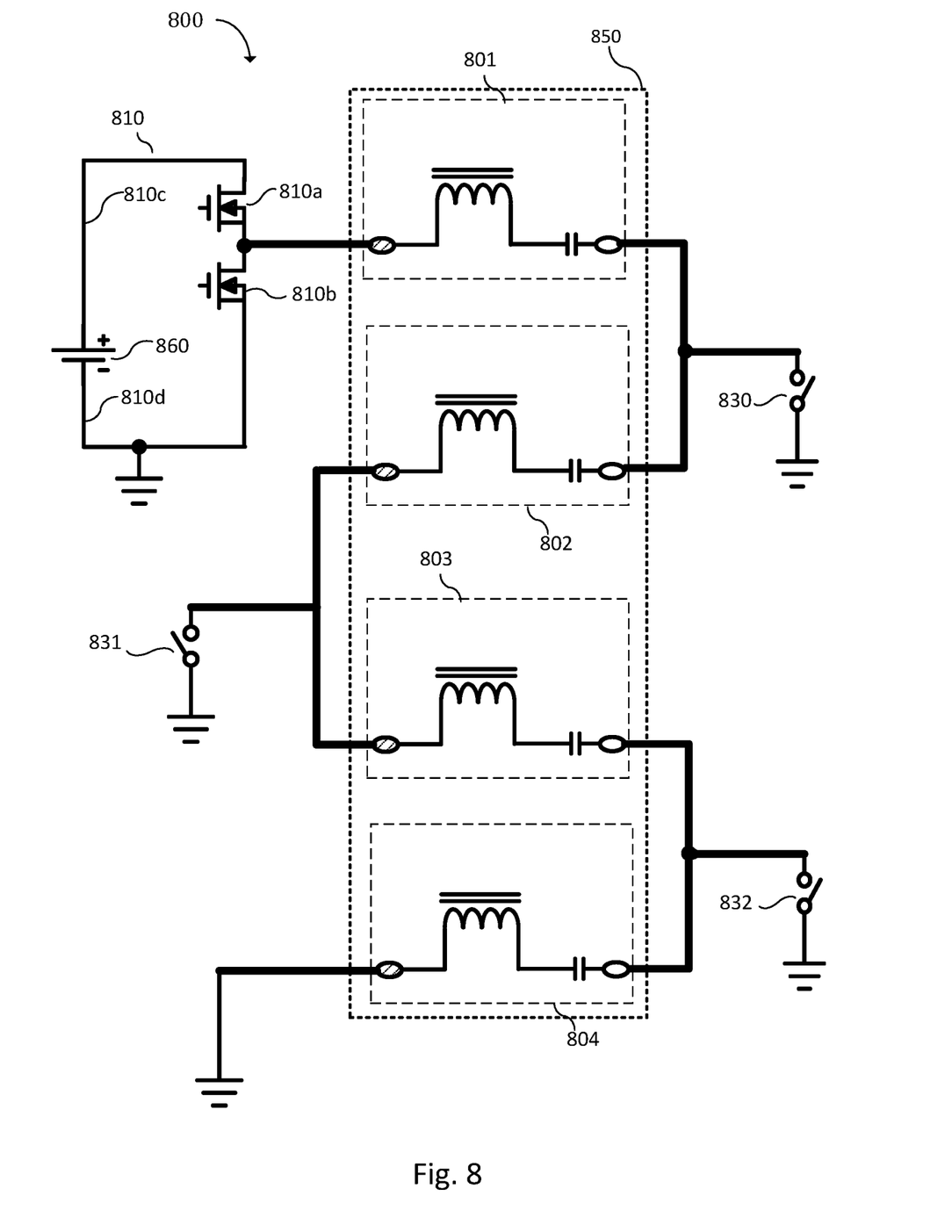
FIG. 8 is a schematic diagram of a wireless power transmitter with an array including multiple tuned resonant microcells, according to one embodiment of the invention.

FIG. 8 illustrates another embodiment of the invention. Wireless power transmitter 800 includes, but is not limited to, an array 850 having microcells 801, 802, 803, and 804, switches 830, 831, and 832, a half-bridge 810, a DC voltage source 860, an upper rail 810c, and a lower rail 810d. Microcells 801, 802, 803, and 804 are all tuned to the same resonant frequency. Half-bridge 810 includes FETs 810a and 810b. Although DC voltage source 860 and half-bridge 810 are shown in FIG. 8, any circuit configured to generate an AC signal is within the scope of the invention. The generated voltage signal can be, but is not limited to, a square wave, a sinusoidal wave, a triangular wave, or a sawtooth wave.

While only four microcells are shown, one of ordinary skill in the art would understand that array 850 may comprise fewer microcells or additional microcells that are connected in series with microcells 801, 802, 803, and 804, as long as the additional microcells are tuned to the same resonant frequency as all microcells within the series. Adding additional microcells to the array would also require adding corresponding switches in a similar manner as shown with respect to switches 830, 831, and 832. Microcells 801, 802, 803, and 804 share the same components of microcell 200 as described above with respect to FIG. 2A and the discussion of its components is not repeated here. Microcells 801, 802, 803, and 804 may have different inductances and capacitances as long as the resonant frequencies for each microcell are equivalent.

Array 850 may be configured to operate with either two, three, or all four microcells activated to participate in the wireless power transfer process. For example, if switch 830 is held open (OFF), and switches 831 and 832 are closed (ON), then microcells 801 and 802 are activated and in series within array 850. As another example, if switches 830 and 831 are held open (OFF), and switch 832 is closed (ON), then microcells 801, 802, and 803 are activated and in series within array 850. As another example, if switches 830, 831, and 832 are all held open (OFF), then microcells 801, 802, 803, and 804 are all activated in series within array 850. In this manner, the size of the transmission area of array 850 may be adjusted (i.e., by increasing the number of the microcells that are involved in the wireless power transfer process) while maintaining a constant resonant frequency for array 850. Microcells may be dynamically deactivated or activated within the series without affecting the resonant frequency of array 850. Alternatively, any or all switches 831, 832, and 832 may be replaced by half-bridges as described in the embodiment with regard to FIG. 5.

Figure 9A:
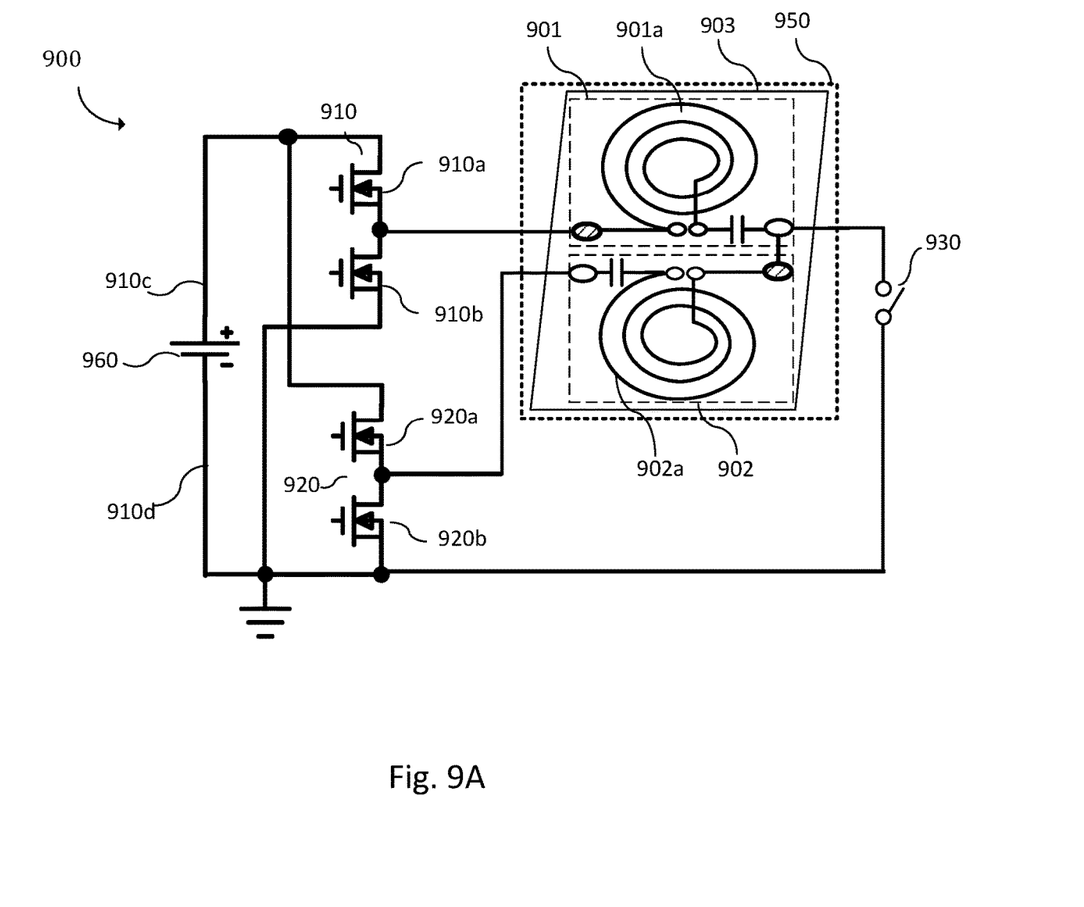
FIG. 9A is a diagram of a wireless power transmitter with an array including multiple tuned resonant microcells, according to one embodiment of the invention.

FIG. 9A illustrates another embodiment of the invention. Wireless power transmitter 900 includes, but is not limited to, an array 950 including microcells 901 and 902, half-bridges 910 and 920, a switch 930, an upper rail 910c, a lower rail 910d, and a single DC voltage source 960. Coils 901a and 902a of microcells 901 and 902 are wound in opposite directions (i.e., opposite in polarity), and located on a magnetic material layer 903. Microcells 901 and 902 are coupled together in such a way that when current is flowing in a clockwise direction in coil 901a the current is flowing in a counter-clockwise direction in coil 902a. Because the magnetic fields generated by current flowing in each of coils 901a and 902a has a different polarity, the magnetic fields attract to form a strong magnetic field that flows from coil 901a to coil 902a. The operation and benefits of pairs of coils producing magnetic fields with opposite polarities is further disclosed in copending U.S. application Ser. No. 15/082,533, entitled "Wireless Power Transfer Using Multiple Coil Arrays," filed on Mar. 28, 2016, the subject matter of which is incorporated herein by reference. Half-bridge 910 includes FETs 910a and 910b and half-bridge 920 includes FETs 920a and 920b. Although DC voltage source 960 and half-bridges 910 and 920 are shown, any circuit configured to generate an AC signal is within the scope of the invention. The generated voltage signal can be, but is not limited to, a square wave, a sinusoidal wave, a triangular wave, or a sawtooth wave. Switch 930, which may be implemented as a mechanical, electrical, or electronic switch, serves the same purpose as half-bridge 530 as described above with respect to FIG. 5.

Current may flow in either direction through array 950. If FET 910a of half-bridge 910 and FET 920b of half-bridge 920 are held on and FET 910b of half-bridge 910 and FET 920a of half-bridge 920 are held off, current flows from half-bridge 610 through microcell 901 to microcell 902. To complete the switching cycle, if FET 910a of half-bridge 910 and FET 920b of half-bridge 920 are held off and FET 910b of half-bridge 910 and FET 920a of half-bridge 920 are held on, the current will reverse direction through array 950.

Figure 9B:
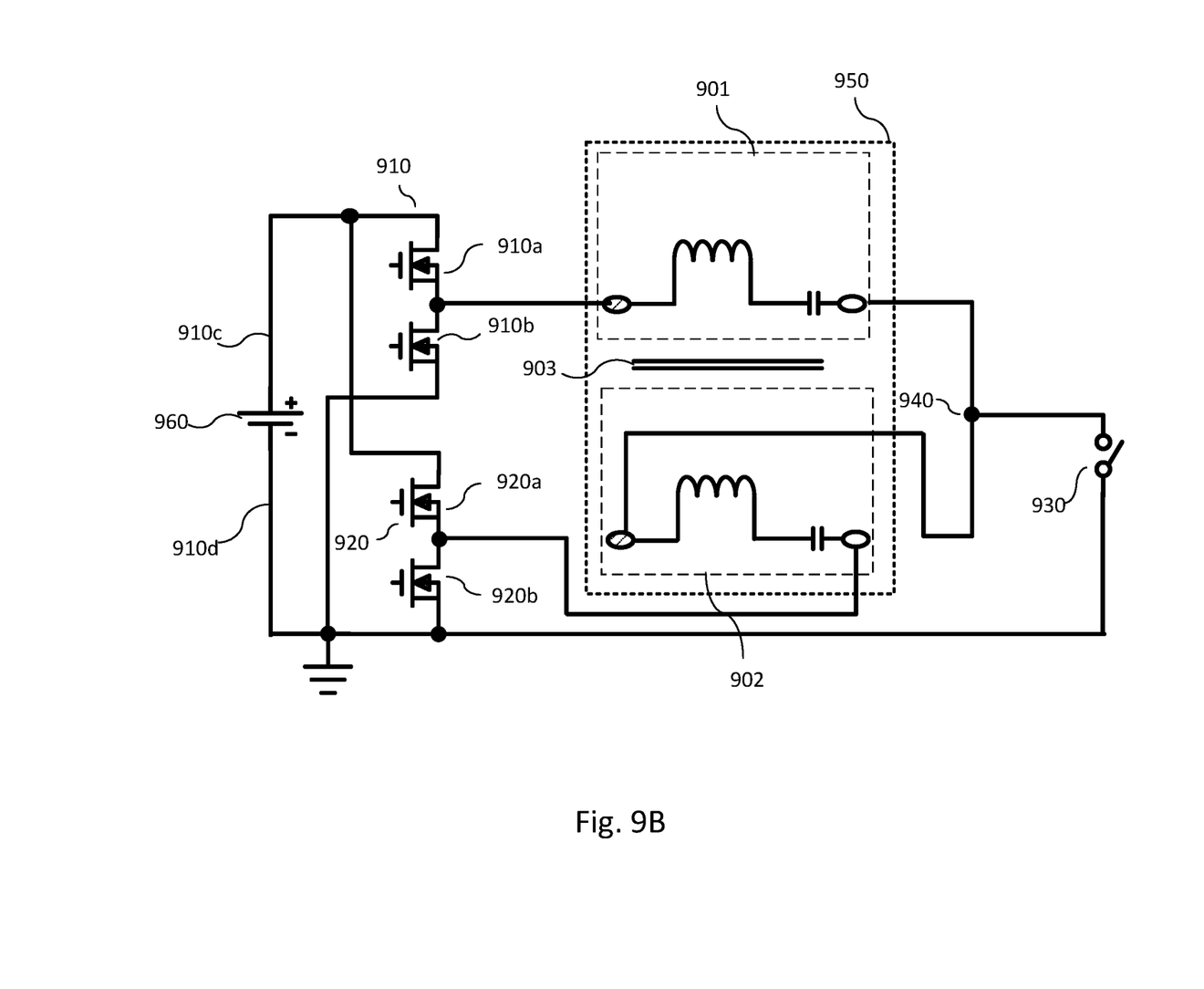
FIG. 9B is a schematic diagram of a wireless power transmitter with an array including multiple tuned resonant microcells, according to one embodiment of the invention.

Microcells 901 and 902 share the same components of microcell 200 as described above with respect to FIG. 2A and the discussion of its components is not repeated here. Microcell 901 may have a different inductance and capacitance than microcell 902 as long as the resonant frequencies for each microcell are equivalent. A current flows through coils 901a and 902a of microcells 901 and 902, respectively, in an opposite direction, resulting in each coil generating a magnetic field with opposing polarity. The opposing magnetic fields attract to form strong magnetic fields. When switch 930 is open (OFF), the current flowing from half-bridge 910 is equal to the current flowing into half-bridge 920, and vice versa. When the current of half-bridges 910 and 920 are equal, microcells 901 and 902 of array 950 may be considered to be connected in series, and therefore the array 950 has the same resonant frequency as microcells 901 and 902. Additional microcells, tuned to the same resonant frequency as microcells 901 and 902, may be added to array 950 without affecting the resonant frequency of array 950. In this manner, the size of the transmission area of array 950 may be adjusted (i.e., by increasing the number of the microcells that are involved in the wireless power transfer process) while maintaining a constant resonant frequency for array 950. FIG. 9B illustrates a schematic view of microcells 901 and 902. As previously discussed, microcells 901 and 902 share a magnetic material layer 903. Excluding shared magnetic material layer 903, microcells 901 and 902 have the other components of microcell 200 (excluding magnetic material layer 205) as described above with respect to FIG. 2B, and the discussion of those components is not repeated here.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A wireless power transmitter comprising:
   a power source configured to generate a time-varying current;
   an array of tuned resonant microcells, each of the tuned resonant microcells configured to operate at a first resonant frequency and comprising:
   a first connection point;
   a second connection point;
   a capacitor;
   a flat coil coupled in series with the capacitor;
   wherein each of the tuned resonant microcells is configured to be coupled in series to another one of the tuned resonant microcells such that the wireless power transmitter is configured to operate the array of tuned resonant microcells at a second resonant frequency that is substantially the same as the first resonant frequency in response to the time-varying current;

a first switch;
a second switch;
a first tuned resonant microcell in the array of tuned resonant microcells coupled to the power source and the first switch;
a second tuned resonant microcell in the array of tuned resonant microcells coupled to the first switch and the second switch, wherein the wireless power transmitter is configured to operate at the second resonant frequency when the first and second tuned resonant microcells are activated in series; and
wherein the wireless power transmitter is configured to operate at the second resonant frequency when the first, second, and a third tuned resonant microcells are activated in series.

2. The wireless power transmitter of claim 1, wherein the wireless power transmitter is configured to operate at the second resonant frequency further in response to when at least two of the tuned resonant microcells are activated in series and at least one of the tuned resonant microcells is deactivated.

3. The wireless power transmitter of claim 1, wherein the first connection point of the first tuned resonant microcell is coupled to the power source and the second connection point of the second tuned resonant microcell is coupled to the power source.

4. The wireless power transmitter of claim 3, wherein the array of tuned resonant microcells further comprises:
the third tuned resonant microcell coupled between the first and second tuned resonant microcell.

5. The wireless power transmitter of claim 1, wherein the first tuned resonant microcell comprises a first coil configured to receive a time-varying current that flows in a first direction, and the second tuned resonant microcell comprises a second coil coupled to the first coil in such a way that the time-varying current flows in a second direction, the first direction being opposite to the second direction.

6. The wireless power transmitter of claim 1, wherein the wireless power transmitter is configured to operate at the second resonant frequency when the first, second, and third tuned resonant microcells are activated in series.

7. The wireless power transmitter of claim 1, wherein the array of tuned resonant microcells further comprises:
the third tuned resonant microcell coupled to the second switch and a ground, such that when the first switch is held open and the second switch is held closed, the first and second tuned resonant microcells are activated in series, and the third tuned resonant microcell is deactivated.

8. The wireless power transmitter of claim 7, wherein the wireless power transmitter is configured to operate at the second resonant frequency when the first and second tuned resonant microcells are activated in series and the third tuned resonant microcell is deactivated.

9. The wireless power transmitter of claim 1, wherein each of the tuned resonant microcells further comprises a magnetic layer.

10. An array comprising:
a plurality of tuned resonant microcells, each of the tuned resonant microcells configured to operate at a first resonant frequency and comprising:
a first connection point;
a second connection point;
a capacitor; and
a flat coil coupled to the capacitor;
wherein the tuned resonant microcells are coupled in series such that the array is configured to operates at a second resonant frequency that is substantially the same as the first resonant frequency;
a first tuned resonant microcell of the plurality of tuned resonant microcells coupled to a power source and a first switch;
a second tuned resonant microcell of the plurality of tuned resonant microcells coupled to the first switch and a second switch;
a third tuned resonant microcell of the plurality of tuned resonant microcells coupled to the second switch and a ground;
wherein the second tuned resonant microcell is coupled in series to the first tuned resonant microcell and the third tuned resonant microcell coupled in series to the first and second resonant microcells; and
wherein the plurality of resonant microcells is configured such that when the first switch is held open and the second switch is held closed, the first and second tuned resonant microcells are activated in series, and the third tuned resonant microcell is deactivated.

11. The array of claim 10, further comprising:
the third tuned resonant microcell coupled to the second switch and the ground, such that when the first switch and the second switch are held open, the first, second, and third tuned resonant microcells are activated in series.

12. The array of claim 10, wherein the first tuned resonant microcell comprises a first coil configured to receive a time-varying current that flows in a first direction, and the second tuned resonant microcell comprises a second coil coupled to the first coil in such a way that the time-varying current flows in a second direction, the first direction being opposite to the second direction.

13. The array of claim 10, wherein each of the plurality of tuned resonant microcells further comprises a magnetic layer.

14. The wireless power transmitter of claim 1, wherein each flat coil from each of the tuned resonant microcells is disposed on a magnetic layer.

* * * * *